(12) United States Patent
Yang et al.

(10) Patent No.: US 9,577,965 B2
(45) Date of Patent: Feb. 21, 2017

(54) METHOD AND DEVICE FOR POSTING MICROBLOG MESSAGE

(71) Applicant: TENCENT TECHNOLOGY (SHENZHEN) COMPANY LIMITED, Shenzhen, Guangdong (CN)

(72) Inventors: Baolong Yang, Guangdong (CN); Yongjian Wu, Guangdong (CN); Feng Gao, Guangdong (CN); Yuan Huang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 223 days.

(21) Appl. No.: 14/289,049

(22) Filed: May 28, 2014

(65) Prior Publication Data

US 2014/0280652 A1  Sep. 18, 2014

Related U.S. Application Data

(63) Continuation-in-part of application No. PCT/CN2012/087000, filed on Dec. 20, 2012.

(30) Foreign Application Priority Data

Dec. 20, 2011 (CN) .......................... 2011 1 0428947

(51) Int. Cl.
*H04L 12/58* (2006.01)
*G06F 17/30* (2006.01)

(52) U.S. Cl.
CPC ......... *H04L 51/046* (2013.01); *G06F 17/3089* (2013.01)

(58) Field of Classification Search
CPC ................ G06F 17/243; G06F 17/2775; G06F 17/30017; G06F 17/30719; G06F 17/30775; G06F 17/30796; G06F 17/30843; G06F 17/3089; G03B 27/521; G06T 11/60; H04L 51/046; Y10S 707/99935; Y10S 707/99942
See application file for complete search history.

(56) References Cited

U.S. PATENT DOCUMENTS 8,638,781 B2 * 1/2014 Lawson .............. H04L 65/1069
370/252
9,152,625 B2 * 10/2015 Louis ...................... G06F 17/30
(Continued)

FOREIGN PATENT DOCUMENTS

CN     101620622 A    1/2010
JP     2011-095866 A  5/2011
(Continued)

OTHER PUBLICATIONS

Office Action issued in corresponding Korean application No. 10-2014-7016648 mailed Mar. 24, 2015.
(Continued)

*Primary Examiner* — Sargon Nano
(74) *Attorney, Agent, or Firm* — Frommer Lawrence & Haug LLP; William S. Frommer

(57) ABSTRACT

Described are a method and a device for posting a microblog message. The method includes: acquiring text content input by a user in a microblog text box; monitoring a posting operating instruction for the text content; calculating the number of the characters of the text content; determining whether the number of the characters of the text contents exceeds a preset-threshold; if the number of the characters of the text content exceeds the preset threshold, converting the text content into a format of messages according to a user selection from a plurality of format settings, and posting the format of the messages as a microblog message, or splitting the text content into multiple microblog message being less than the preset threshold; and if the number of the characters
(Continued)

of the text content does not exceed the preset threshold, directly posting the text content as the microblog message.

17 Claims, 4 Drawing Sheets

(56) References Cited

U.S. PATENT DOCUMENTS

| | | | |
|---|---|---|---|
| 2006/0200568 A1* | 9/2006 | Kim | H04L 51/38 709/227 |
| 2007/0174401 A1* | 7/2007 | Chu | G06Q 10/107 709/206 |
| 2007/0230506 A1* | 10/2007 | Zou | H04L 12/5835 370/473 |
| 2009/0176518 A1* | 7/2009 | Doni | H04W 4/12 455/466 |
| 2009/0276500 A1* | 11/2009 | Karmarkar | G06F 17/30864 709/206 |
| 2010/0211868 A1* | 8/2010 | Karmarkar | H04M 1/72547 715/234 |
| 2010/0312769 A1* | 12/2010 | Bailey | G06F 17/30705 707/740 |
| 2011/0178995 A1* | 7/2011 | Suchter | G06F 17/30864 707/692 |
| 2011/0231296 A1* | 9/2011 | Gross | G06Q 10/10 705/37 |
| 2012/0042020 A1* | 2/2012 | Kolari | G06Q 10/107 709/206 |
| 2012/0143595 A1* | 6/2012 | Li | G06F 17/30719 704/9 |
| 2013/0005346 A1* | 1/2013 | Chu | H04W 4/12 455/450 |
| 2013/0159277 A1* | 6/2013 | Liu | G06F 17/271 707/709 |
| 2014/0106795 A1* | 4/2014 | Blades | G06F 17/214 455/466 |
| 2014/0106800 A1* | 4/2014 | Zhu | H04L 69/22 455/466 |
| 2014/0337311 A1* | 11/2014 | Ling | G06F 17/30979 707/710 |

FOREIGN PATENT DOCUMENTS

| | | |
|---|---|---|
| KR | 10-2003-0011488 A | 2/2003 |
| KR | 10-0732114 B | 6/2007 |

OTHER PUBLICATIONS

Gentler Depravity, "tencent microblog update: converting super-long characters into pictures easily", paragraphs [0001]-[0003] and figures 1-3, origin: reteng/community and search/tencent microblog, Aug. 30, 2011 (Aug. 30, 2011), network search date: May 3, 2013 internet: <URL:http://reteng.qq.com/info/10636.html>.

Sing1984, "[Software sharing] Microblog story 1.62 updating, the person who like microblog may try", the informative abstract part, origin:Wei Feng/iPhone game • software discussion area, Sep. 4, 2011 (Sep. 4, 2011), network search date: May 3, 2013, internet <URL:http//bbs.weiphone.com/read-htm-tid-28021363.html>.

* cited by examiner

METHOD AND DEVICE FOR POSTING MICROBLOG MESSAGE

CROSS-REFERENCE TO RELATED APPLICATIONS

This application is a continuation-in-part application of PCT Patent Application No. PCT/CN2012/087000, entitled "METHOD AND DEVICE FOR POSTING MICROBLOG MESSAGE", field on Dec. 20, 2012, which claims the priority benefit of Chinese Patent Application No. 201110428947.9 filed on Dec. 20, 2011, both of which are incorporated by reference herein in their entirety.

FIELD OF THE INVENTION

The present disclosure relates to a field of computer communication, and specifically to a method and a device for positing a microblog message.

BACKGROUND OF THE INVENTION

Instant messaging (IM) tool is widely used by using point to point technology with a development of computer network communication technology. IM tool is accepted by many users and is served as an important part of daily life and work. Users can communicate with friends, colleagues, and classmates by using the IM tool.

Micro blog (microblog) is a part application of IM tool, and the microblog is information sharing, transmitting and acquiring platform based on a relationship of a plenty of microblog users. Microblog user can login microblog, express emotion by posting microblog messages or pictures, share information with other users who focus on him/her through clients such as personal computers (PC), mobile phones. Usually, the number of the characters is limited to a preset number, such as the number of the characters is less than 140. The application of the microblog supplied by the IM tool can realize a posting of personal instant message and an interaction of microblog users. The microblog becomes an internet business which develops the most rapidly now.

It can be seen from above description, the posting microblog message method in typical technology, a character number of each item of microblog message is less than a predetermined number, for example 140, is required. Thus the user does not have enough text content room to express his/her emotion clearly within the 140 characters. If a user wants to express his/her emotion clearly, a microblog message is edited first, and then the microblog message is posted. The number of the characters of the microblog message is less than 140. After the microblog message is post, another microblog message is edited, then posited. Repeat the method continuously until the user expresses his/her emotion clearly. However, it takes much time for posting all of the microblog messages. From the above description, it can be seen that, in typically technology, the method for posting microblog takes much longer time when the microblog message includes more characters. The process of posting the microblog message is complex and frequently operations are needed. Thus an efficiency of posting the microblog message is low and an experience of using the microblog message is reduced.

SUMMARY OF THE INVENTION

In view of this, a method and a device for posting microblog message are provided in embodiments of present disclosure. The method and the device for posting microblog message reduce an operation complexity of posting the microblog message and improve the efficiency of posting the microblog message.

In an embodiment of present disclosure, the method for posting microblog message includes:

acquiring text content input by a user in a microblog text box; monitoring a posting operation instruction for the text content;

calculating the number of characters of the text content, determining whether the number of the characters of the text content exceeds a preset threshold;

converting the text content into a format of messages according to a user selection from a plurality of format settings, and posting the format of the messages as a microblog message, if the number of the characters of the text content exceeds the preset threshold; and if the number of the characters of the text content does not exceed the preset threshold, directly posting the text content as the microblog message.

The device for posting a microblog message in the embodiment of present disclosure, including: an editing module, an acquiring module, a monitoring module, a calculating module, a storing module, a determining module, a processing module and a posting module.

The editing module is configured to receive text content and posting operation instruction input by a user.

The acquiring module is configured to acquire the text content input by the user.

The calculating module is configured to calculate the number of characters of the text content.

The monitoring module is configured to monitor the posting operation instruction for the text content of the user.

The storing module, configured to store a preset threshold.

The determining module is configured to the number of the characters of the text content exceeds the preset threshold.

The processing module is configured to convert the text content into a picture when the number of the characters of the text content exceeds the preset threshold, and send the picture to the posting module; or split the text content into multiple microblog messages, and send the multiple microblog messages to the posting module; the number of the characters contained in each of the multiple microblog message being less than the preset threshold.

The posting module is configured to post the picture received form the processing module as a microblog message, or post the multiple microblog messages received from the processing module.

It can be seen from the above all description, the method and device for posting microblog message in the embodiments of present disclosure is implemented through acquiring the text content input by the user in the microblog text box; monitoring the post operation instruction for the text content of the user; calculating the character number of the text content, determining whether the number of characters of the text content exceeds the preset threshold. If the number of characters of the text content exceeds the preset number threshold, converting the text content into picture according to a choice of the user, or splitting the text content input into multiple microblog messages, and posting the multiple microblog messages in an order of the multiple microblog messages. The number of characters of each microblog message of the multiple microblog messages is less than the preset threshold. Thus, when the number of characters of the microblog message being shared exceeds the microblog message character number threshold, the number of characters is calculated automatically and processed as a posting method. Posting the microblog message does not need to be divided manually and to be operated frequently by the user. It may reduce the user operation complexity, save time and improve the microblog message posting efficiency. It solves a problem caused by a limitation of the character number of the microblog message when the user wants to posting a plenty of text content into microblog message, simplify the steps of posting the microblog message when a third part is needed to convert the multiple text content into image, and greatly enhance the user experience when the user posts the text content as a microblog message or multiple microblog messages.

DETAILED DESCRIPTION OF ILLUSTRATED EMBODIMENTS

Figure 1:
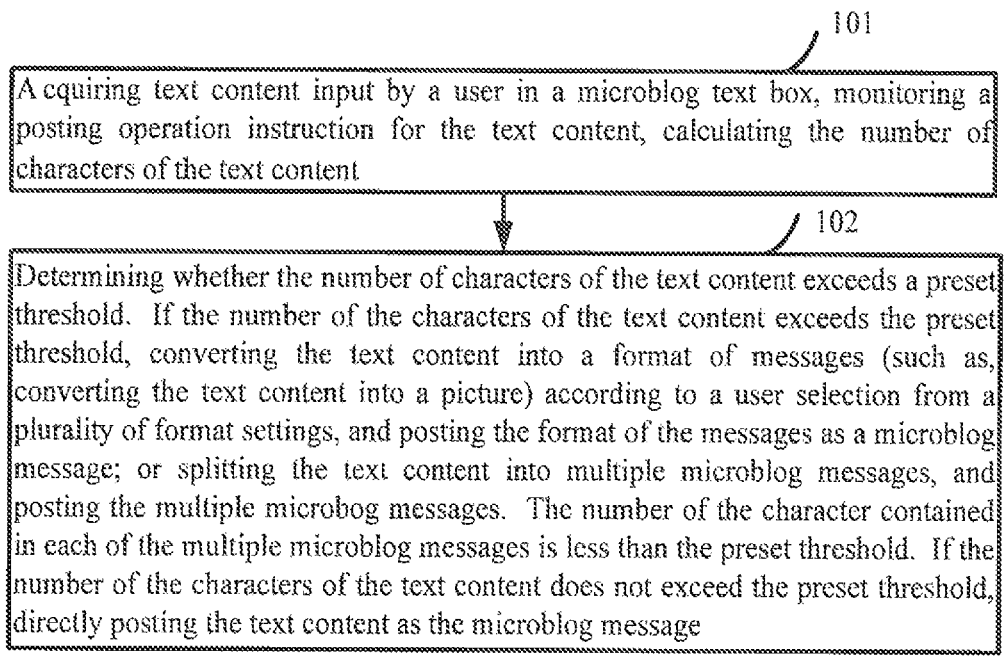
FIG. 1 is a flow chart of a method for posting microblog message according to an exemplary embodiment of present disclosure.

Further description of the present invention will be illustrated, which combined with embodiments in the drawings, in order to make the purpose, the technical solution, and the advantages clearer.

In an exemplary embodiment of present disclosure, a character number of microblog message is detected by a microblog client automatically when the text content has been edited is being posted as a microblog message to the microblog. Because a character is corresponding to a determinate character number, a character number of the microblog message is acquired by automatically detected by the microblog client. If the character number exceeds a predetermined character number threshold, the microblog message is divided into multiple microblog messages automatically, then the multiple microblog messages are posted.

In an exemplary embodiment of present disclosure, the microblog client may also converts the text content edited by the user into a picture by using a text-image technology, and then the microblog message is post in a picture form. Thus, all of the text content edited by the user is posted in the microblog message in a picture form, but not is divided into multiple microblog messages in text form. Other user can browse a content of the microblog message according to the image being received. It is not need to browse the multiple microblog messages item by item, that the user experience can be improved efficiently.

In an exemplary embodiment of present disclosure, the microblog client may be a client being installed in a terminal or a client being directly visited through a web. In following description, taking the microblog client is a client can be directly visited by a web for example.

In typical technology, a third part is usually needed to convert the text form into a picture form. The third part may be a website converting text into image, such as the "changeweibo.com". The website is logged in by the user, the text content is input in a text box in a special conversion interface, a "converting into image" widget bellow the special conversation interface is clicked, the text content of the text box is converted into a plain text image. Then, a "linkage of image being converted" widget is clicked by the user, the image being converted is stored in a special location, for example, the local disk. At last, the microblog message interface is logined by the user, the image being converted is browsed, and then a microblog message including the image is posted.

In an exemplary embodiment of present disclosure, if posting microblog message by using the above conversation text into image process, a microblog message which character number exceeds a predetermined number (such as 140) being posted by the user is complex. Firstly, the "changeweibo.com" is firstly logined in by the user, the text content is edited, and the text content being edited is converted into a picture. Secondly, the plain text image being converted is saved in the local disk. Lastly, the microblog interface is landed, a title of the microblog message is witted, the plain text image is inserted, and then the microblog message is posted. The "changeweibo.com" is landed for executing a process of converting a text into a picture, the text may not be converted into a picture if there is a failure of network commutation or a failure of the "changeweibo.com".

From above description, in an exemplary embodiment of present disclosure, a text-image tool is embedded in the IM tool, that is the text-image tool is integrated in the IM tool, and the text-image tool is included in the microblog interface. Therefore, a microblog message is edited and posted via the text-image tool of the microblog without being operated frequently. The embedment of the text-image tool into the IM tool, and the integration of the text-image tool with the IM tool in programs is a traditional technology means to a programmer of ordinary skill in the art, therefore the embedment and the integration are not described here. In the exemplary embodiment, the microblog client is an application of the IM tool, thus the text-image tool is directly integrated in the IM tool. In implementation of embodiment of present disclosure, the text-image tool may also be independent from the IM tool. There is no influence to implementation of the embodiment of present disclosure when the text-image tool is embeded in the microblog client.

Referring to FIG. 1, FIG. 1 is a flow chart of a method for posting microblog message according to an exemplary embodiment of the present disclosure. The method for positing microblog includes in following steps.

Step 101, acquiring text content input by a user in a microblog text box, monitoring a posting operation instruction for the text content, calculating the number of characters of the text content.

In this step, the microblog client installs a text-picture tool, and displays the text-picture tool on a microblog interface. When the user logins the microblog, the user can input and edit the text content in the microblog text box, and the user does not need to consider the number of characters of the text content. When the user finishes editing the text content and wants to post the microblog messages, the microblog client monitors the posting operation instruction for the text content and calculates the numbers of the characters of the text content. For example, the posting operation instruction may be a "posting" widget or an "OK" widget, etc.

When the user finishes editing the text content and wants to post the microblog messages, the microblog client monitors the posting operation instruction for the text content includes the flowing steps.

Monitoring whether the user triggers the "posting" widget or the "OK" widget. If the user triggers the "posting" widget or the "OK" widget, the text content is determined to finish editing.

In the step, when the text content is determined to finish editing, the user clicks the "posting" widget or the "OK" widget under the microblog text box. When the microblog client monitors the operation to the "posting" widget or the "OK" widget, the microblog client determines the text content finish editing.

Further, in the step, pictures or tables can be inserted into the text content being edited.

The number of the characters of the letter or punctuation can be looked up in related documents, it is not described here.

Step 102, determining whether the number of characters of the text content exceeds a preset threshold. If the number of the characters of the text content exceeds the preset threshold, converting the text content into a format of messages (such as, converting the text content into a picture) according to a user selection from a plurality of format settings, and posting the format of the messages as a microblog message; or splitting the text content into multiple microblog messages, and posting the multiple microblog messages. The number of the character contained in each of the multiple microblog messages is less than the preset threshold. If the number of the characters of the text content does not exceed the preset threshold, directly posting the text content as the microblog message.

In the step, as to the microblog message, the preset threshold can be 140. If the number of the characters of the text content does not exceed 140, the microblog client directly posts the text content as the microblog message in the typically technology. If the number of the characters of the text content exceeds the preset threshold, the microblog client processes the text content in a preset posting method, and posts the text content after the process as a microblog message or multiple microblog messages.

Processing the text content in a preset posting method, and posting the text content after the process as a microblog message or multiple microblog messages includes the two following manners.

In a first method, the microblog terminal splits the text content input by the user into multiple microblog messages and posts the multiple microblog messages in an order of the multiple microblog messages. The number of the characters contained in each of the multiple microblog messages is less than the preset threshold.

In a second method, the microblog terminal converts the text content into a format of messages (such as in a picture form) according to a user selection from a plurality of format settings, and posts the format of the message as a microblog message.

In the first method, it is better that the microblog terminal splits the text content by taking sentences in the text content as units. For example, a full stop, an exclamatory mark or a semicolon are served as an end mark of a microblog message. Of course, in practical operation, the microblog terminal splits the text content by taking 140 characters as a unit. Thus, the number of the characters contained in each of the multiple microblog messages except for the last microblog message is 140.

The process of converting the text content in a format of message, related documents can be looked up in related documents, it is not described here. In embodiment of present disclosure, after converting the text content into a format of message, the format of the message may not need to be stored. Or the format of the message can be stored in a buffer, and the format of the message is deleted automatically after posting the format of the message as a microblog message. Thus, storage is reduced.

Figure 2:
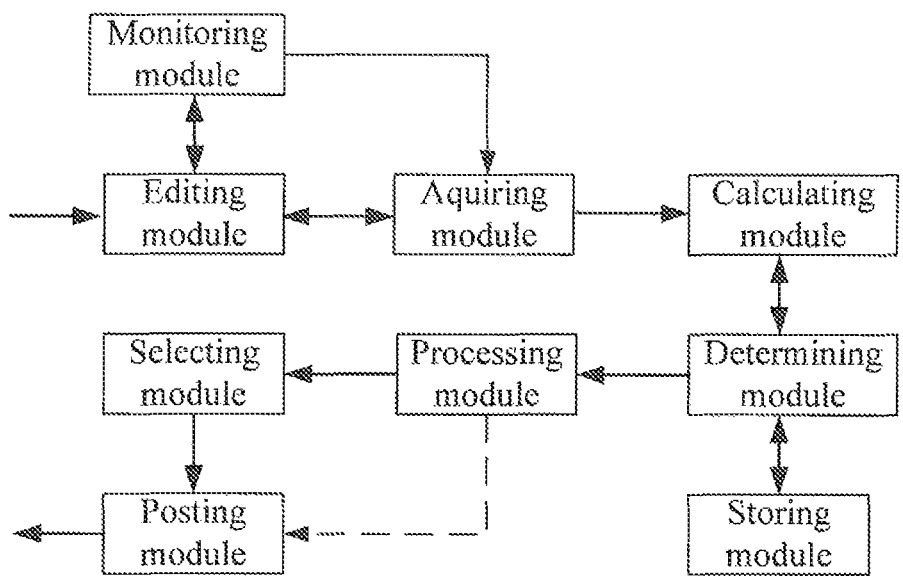
FIG. 2 is a schematic diagram of a device for posting microblog message according to an exemplary embodiment of present disclosure.

Referring to FIG. 2, FIG. 2 is a schematic diagram of a device for posting microblog message according to an exemplary embodiment of the present disclosure. As shown in FIG. 2, the device for posting microblog message includes an editing module, an acquiring module, a monitoring module, a calculating module, a storing module, a determining module, a processing module, and a posting module.

The editing module is configured to receive text content and a posting operation instruction input by a user.

The acquiring module is configured to acquire the text content input by the user.

The calculating module is configured to calculate the number of characters of the text content.

The monitoring module is configured to monitor the posting operation instruction for the text content of the user.

The storing module is configured to store a preset threshold.

In the embodiment of present disclosure, the monitoring module monitors whether the user clicks a preset "posting" widget. If the user clicks the "posting" widget, the text content is determined to finish editing.

The determining module is configured to determine whether the number of the characters of the text content exceeds a preset threshold.

The processing module is configured to process the text content input by the user.

The posting module is configured to post the text content as a microblog message or multiple microblog messages, after the process.

In embodiment of present disclosure, the device for posting microblog message further includes a selecting module. The selecting module is configured to determine whether converting the text content input by the user into a format of messages according to the user selection.

The processing module (not shown) includes the following modules.

A picture converting sub-module, which is configured to convert the text content into a picture, convert a first sentience of the text content as a title of the picture and send the picture with the title to the posting module. Or A text splitting sub-module, which is configured to split the text content into multiple microblog messages, and send the multiple microblog messages to the posting module in an order of the multiple microblog messages. The number of the characters contented in each of the multiple microblog messages is less than the preset threshold.

Figure 3:
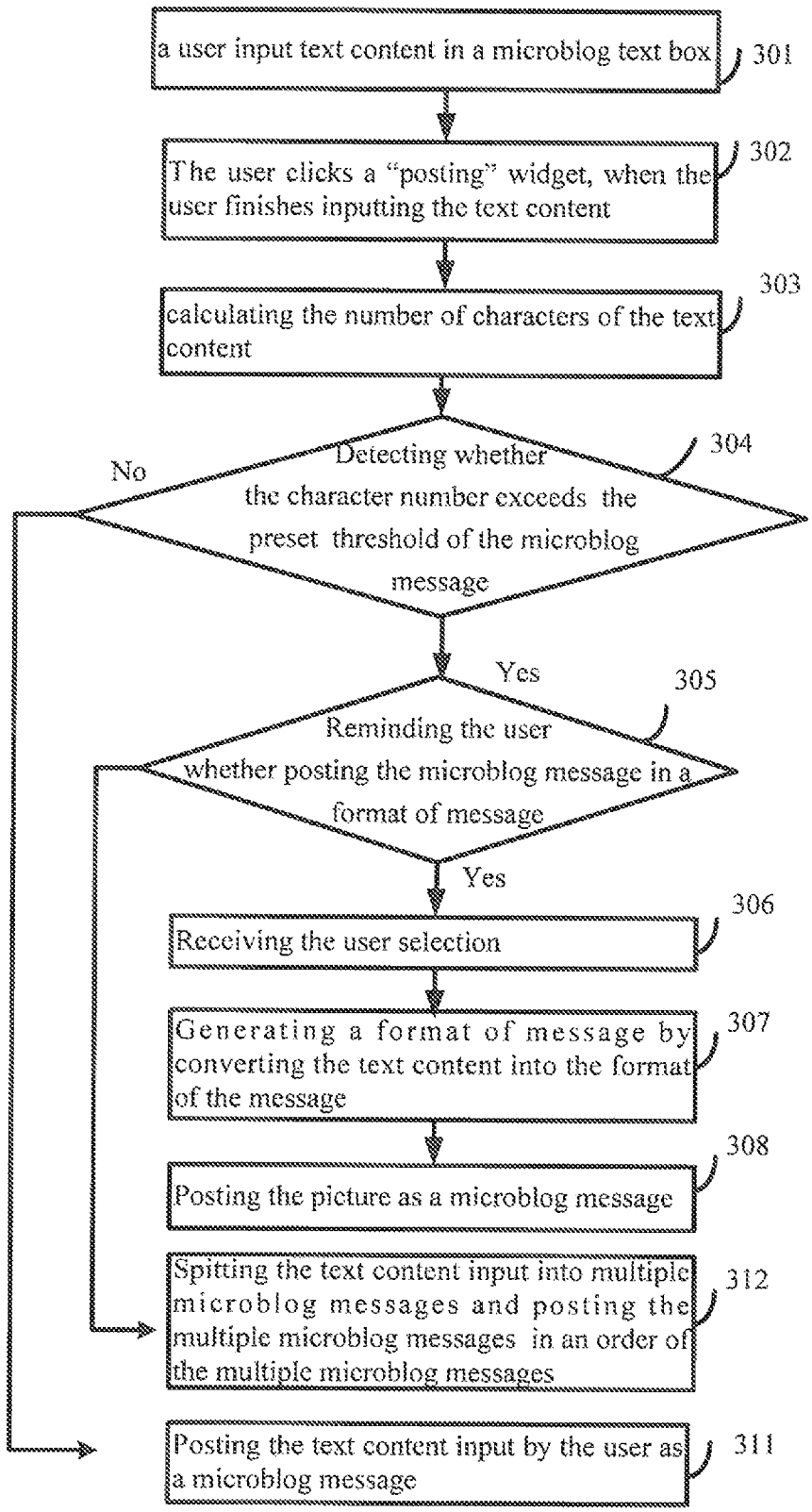
FIG. 3 is a flow chart of a method for posting microblog message according to another exemplary embodiment of the present disclosure.

Referring to FIG. 3, FIG. 3 is a flow chart of a method for posting microblog message according to exemplary embodiment of the present disclosure. As show in FIG. 3, the method for positing microblog message includes the following steps.

Step 301, a user input text content in a microblog text box.

In the step, the user logins the microblog client, directly input the text content or pastes the text content in the microblog text box, and edits the text content.

Step 302, the user clicks a "posting" widget, when the user finishes inputting the text content.

In the step, when the user input the text content in the microblog text box, the user does not need to consider the number of the text content in the microblog text box. The user can directly input all the text content.

Step 303, calculating the number of characters of the text content.

In the step, when the microblog client detects the user clicks the "posting" widget, the microblog client calculates text content information of the microblog text box. In another word, the microblog client calculates the number of the characters of the text content Step 304, the microblog client determines whether the number of the characters of the text content exceeds a preset threshold. If the number of the characters of the text content exceeds the preset threshold, a step 305 is implemented; otherwise, a step 311 is implanted.

In the step, the preset threshold can be 140. If the number of the characters of the text content exceeds the preset threshold, it means that the text content needs to process before posting.

Step 305, reminding the user whether posting the microblog message in a format of message (such as in a picture form) according to a user selection from a plurality of format settings.

In the step, when the number of the characters of the text content exceeds 140, the microblog client displays selecting and noticing information to notice the user posting the format of messages as a microblog message or posting multiple microblog messages.

Step 306, receiving the user selection. If the user selects to post the microblog message in a format of message (such as, in a picture format), a step 307 is implemented; otherwise, a step 312 is implemented.

Step 307, generating a format of message by converting the text content into the format of the message. For example, generating a picture by converting the text content into a picture. In the following, taking the format of the message is a picture for example.

In the step, after generating the message, the step further includes the flowing steps.

Converting the first sentence of the text content as the title of the picture.

Step 308, posting the picture as a microblog message.

In the step, posting the picture with a text title, that is posting the picture with the text title as a microblog message.

Step 311, posting the text content input by the user as a microblog message.

Step 312, spitting the text content into multiple microblog messages, and posting the multiple microblog messages in an order of the multiple microblog messages. The number of the characters contained in each of the multiple microblog messages is less than the preset threshold.

In the step, if the user selects does not post the microblog message in picture form, the microblog client splits the text content into multiple microblog messages, and posts the multiple microblog messages in an order of the multiple microblog messages. The number of the characters contained in each of the multiple microblog messages is less than the preset threshold.

It can be seen from the above description, the method and device for posting microblog message in the exemplary embodiments of present disclosure are implemented through automatically calculating the number of characters of the text content input by the user. If the number of characters exceeds the preset threshold, the text content is split automatically into multiple microblog messages. Or, converting the text content into a format of messages (such as, picture) automatically and posting the picture as a microblog message. Thus, the method and device for posting microblog message does not need to be split the text content into multiple microblog messages manually and does not to be operated frequently by the user. It can reduce the user operation complexity, improve the microblog message posting efficiency, solve a problem caused by a limitation of the number of characters of the microblog message when the user wants to posting a plenty of text content into microblog message, simplify the steps of posting the microblog message when a third part is needed to convert the multiple text content into picture, and greatly enhance the user experience when the user posts the text content as a microblog message or multiple microblog messages.

Figure 4:
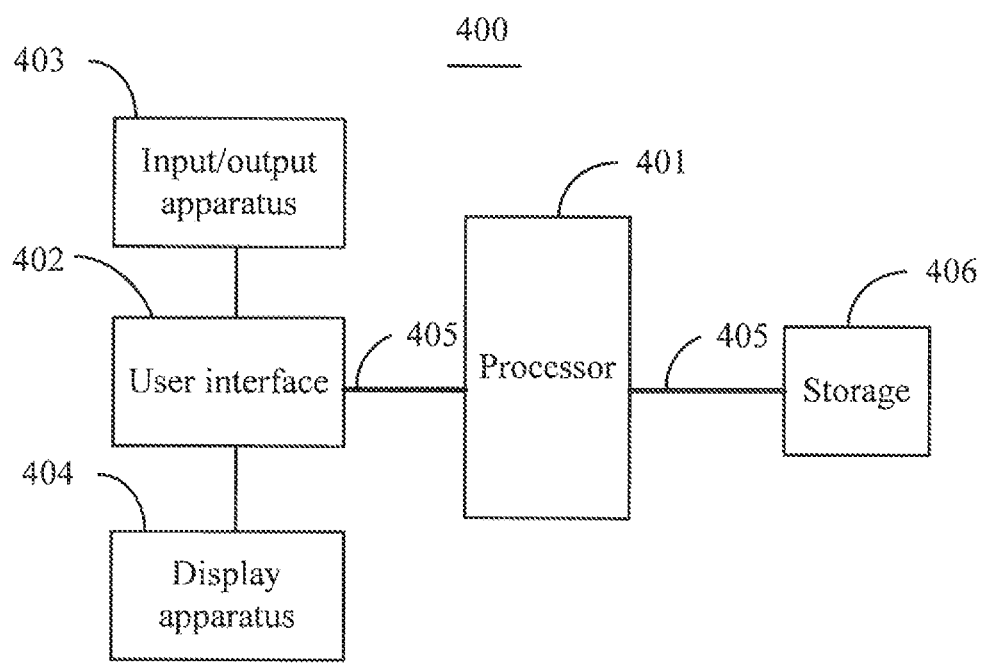
FIG. 4 is a schematic diagram of a microblog client for posting microblog message according to an exemplary embodiment of present disclosure.

Referring to FIG. 4, it is a schematic diagram of a microblog client for posting microblog message according to an exemplary embodiment of present disclosure. The microblog client 400 can be but not limit to a smart phone, a table computer, a personal digital computer (PDA), a mobile Internet device (MID), etc. As shown in FIG. 4, the microblog client 400 can include but not limited to a processor 401, a user interface 402, an input/output apparatus 403, a display apparatus 404, a bus 405, and a storage 406. In other embodiment, certain apparatus may be omitted and other apparatus may be included. The user interface 402 is connected to the processor 401 via a bus 405, and the storage 406 is also connected to the processor 401 via a bus 405.

The input/output apparatus 403 is configured to input or output information for the microblog client 400, such as input the text content. The input/output apparatus 403 can includes a keyboard, a mouse, or a touch panel.

The display apparatus 404 is configured to display content or information which is input or generated. For example, the display apparatus 404 displays a text-picture tool on a microblog interface.

The bus 405 is configured to deliver information between the processor 401 and the user interface 402, and also deliver information between the processor 401 and the storage 406.

The storage 406 is configured to store computer programs. The computer programs are configured to implement various processes, when executed by the processor 401. The programs stored in the storage 406 can be basic application programs, or third application programs. The storage 406 can be a read only memory (ROM), a random access memory (RAM), a U-disk, a removable hard disk, etc.

The computer programs stored in the storage 406 include but not limited to basic application programs, such as microblog programs. The storage 406 may be a public data base for running software, and the storage 406 stores plug-ins and computer programs. The storage 406 can dynamic replace codes and data which are stored in a memory. The storage 406 installs third application programs which are configured to realize a basic application function.

The processor 401 may include any appropriate processor or processors. Further, processor can include multiple cores for multi-thread or parallel processing. The processor 401 calls the computer programs stored in the storage 406. When the microblog client 400 running a configure for realizing the basic application function, the processor 401 performs the following operations.

Acquiring text content input by a user in a microblog text box, monitoring a posting operation instruction for the text content, and calculating the number of characters of the text content.

Determining whether the number of the characters of the text content exceed a preset threshold. If the number of the characters of the text content exceeds the preset threshold, converting the text content into a format of messages (such as, converting the text content into a picture) according to a user selection from a plurality of format settings, and posting the format of the messages as a microblog message; or splitting the text content into multiple microblog messages, and posting the multiple microblog messages. The number of the character contained in each of the multiple microblog messages is less than the preset threshold. If the number of the characters of the text content does not exceed the preset threshold, directly posting the text content as the microblog message.

After the microblog client 400 running a configure for realizing the basic application function, the processor 401 calls the computer programs via the bus 405 to perform the following operations.

A user input text content in a microblog text box. In detail, the user logins the microblog client 400 directly input the text content or pastes the text content in the microblog text box via the input/output apparatus 403.

The user clicks a "posting" widget which is displayed on the display apparatus 404 via the input/output apparatus 403, when the user finishes inputting the text content.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A method for posting microblog message on a network, comprising:
    acquiring text content input by a user in a microblog text box;
    monitoring a posting operation instruction for the text content;
    calculating the number of characters of the text content;
    determining whether the number of the characters of the text content exceeds a preset threshold;
    converting the text content into a format of messages, including the format of a picture, according to a user selection from a plurality of format settings, and posting the converted format of messages as a microblog message on the network, if the number of the characters of the text content exceeds the preset threshold; and
    posting the text content as the microblog message on the network, if the number of the characters of the text content does not exceed the preset threshold.

2. The method according to claim 1, further comprising: splitting the text content into multiple microblog messages, if the number of the characters of the text content exceeds the preset threshold, the number of the characters contained in each microblog message being less than the preset threshold; and
    Posting the multiple microblog messages.

3. The method according to claim 2, wherein the step of posting the multiple microblog messages comprises: posting the multiple microblog messages in an order of the multiple microblog messages.

4. The method according to claim 2, wherein the step of splitting the text content into multiple microblog messages comprises: splitting the text content by taking sentences in the text content as units, each sentence corresponding to one unit, and the number of the characters contained in each sentence is less than the preset threshold.

5. The method according to claim 1, further comprising: receiving the user selection; or reminding the user to make the user selection when the number of characters of the text content exceeds the preset threshold, and receiving the user selection.

6. The method according to claim 1 after the step of converting the text content into a picture, further comprising: converting a first sentence of the text content as a title of the picture; and posting the picture with the title as a microblog message.

7. A device for posting microblog message on a network, comprising:
    a memory storing a set of program codes; and
    a processor configured to invoke the set of program codes to:
    receive text content and a posting operation instruction input by a user;
    acquire text content input by the user;
    calculate the number of characters of the text content;
    monitor the posting operation instruction for the text content of the user;
    store a preset threshold;
    determine whether the number of the characters of the text content exceeds the preset threshold;
    convert the text content into a format of messages, including the format of a picture, according to a user selection from a plurality of format settings, if the number of the characters of the text content exceeds the preset threshold,
    and post the converted format of messages received as a microblog message on the network.

8. The device according to claim 7, wherein the set of program codes is invoked by the processor to split the text content into multiple microblog messages, if the number of the characters of the text content exceeds the preset threshold, the number of the characters contained in each microblog message being less than the preset threshold; and post the multiple microblog messages.

9. The device according to claim 8, wherein the set of program codes is invoked by the processor to convert the text content into a picture, convert a first sentience of the text content as a title of the picture and post the picture with the title to the posting module;
    split the text content into multiple microblog messages, if the number of the characters of the text content exceeds the preset threshold, the number of the characters contented in each multiple microblog messages being less than the preset threshold, and post the multiple microblog message in an order of the microblog messages.

10. The device according to claim 7, wherein the set of program codes is invoked by the processor to determine whether converting the text content into a format of messages according a user selection.

11. A non-transitory computer readable storage medium storing computer-executable instructions that, when executed by at least one processor, perform a method comprising steps of:
    acquiring text content input by a user in a microblog text box;
    monitoring a posting operation instruction for the text content;
    calculating the number of characters of the text content;
    determining whether the number of the characters of the text content exceeds a preset threshold;
    converting the text content into a format of messages, including the format of a picture, according to a user selection from a plurality of format settings, and posting the converted format of messages as a microblog message on a network if the number of the characters of the text content exceeds the preset threshold, the number of the characters contained in each microblog message being less than the preset threshold; and posting the text content as the microblog message on the network, if the number of the characters of the text content does not exceed the preset threshold.

12. The non-transitory computer readable storage medium according to claim 11, wherein the instructions further perform the steps of: splitting the text content into multiple microblog messages, if the number of the characters of the text content exceeds the preset threshold, the number of the characters contained in each microblog message being less than the preset threshold; and posting the multiple microblog messages.

13. The non-transitory computer readable storage medium according to claim 12, wherein the step of posting the multiple microblog messages comprises: posting the multiple microblog messages in an order of the multiple microblog messages.

14. The non-transitory computer readable storage medium according to claim 12, wherein the step of splitting the text content into multiple microblog messages comprises: splitting the text content by taking sentences in the text content as units, each sentence corresponding to one unit, and the number of the characters contained in each sentence is less than the preset threshold.

15. The non-transitory computer readable storage medium according to claim 11, wherein the instructions further perform the steps of: receiving the user selection; or reminding the user to make the user selection when the number of characters of the text content exceeds the preset threshold, and receiving the user selection.

16. The non-transitory computer readable storage medium according to claim 11, wherein, after converting the text content into a picture, the instructions further perform the steps of: converting a first sentence of the text content as a title of the picture; and posting the picture with the title as a microblog message.

17. The non-transitory computer readable storage medium according to claim 11, wherein the method further comprises steps of:

storing the format of the message in a buffer, and the format of the message is deleted automatically after posting the format of the message as a microblog message.

* * * * *